Patented June 20, 1933

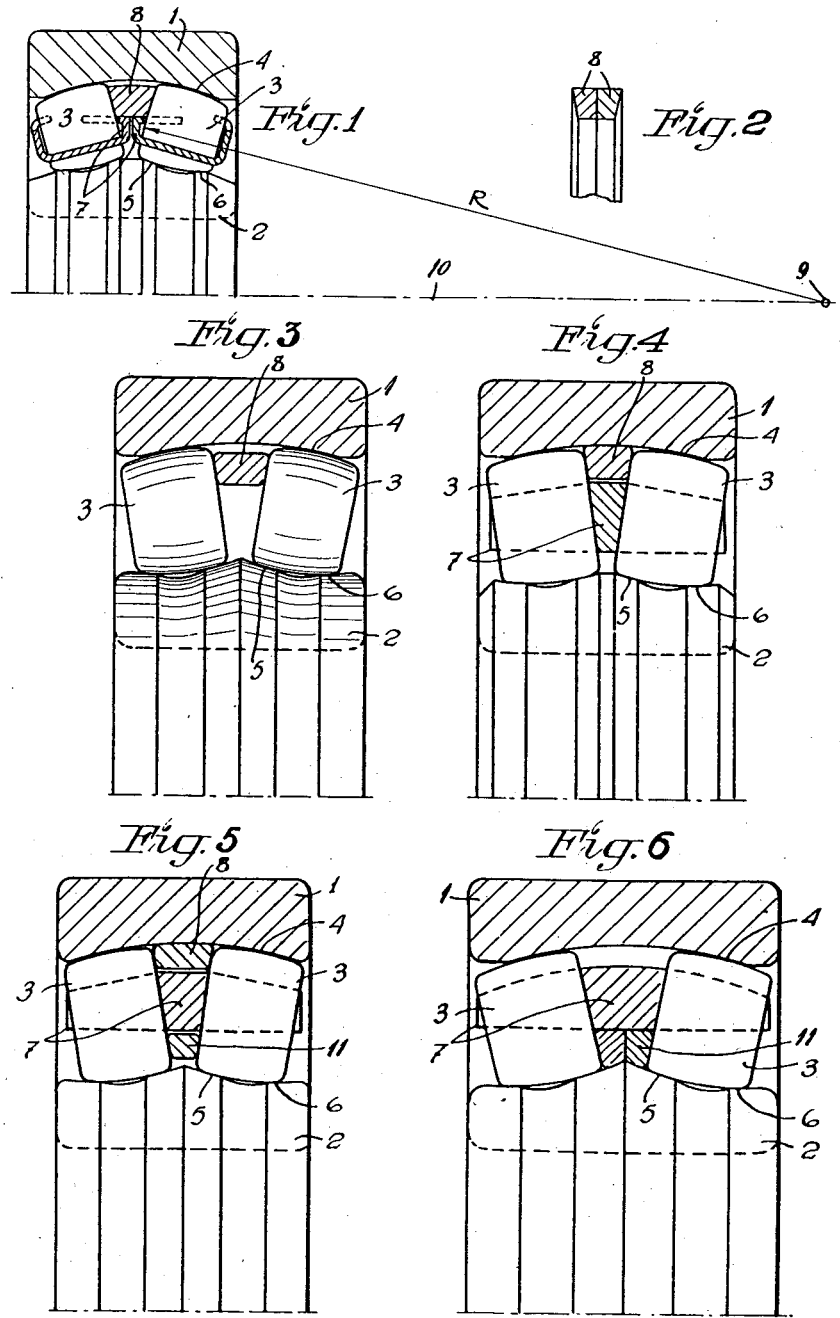

1,914,548

UNITED STATES PATENT OFFICE

SVEN GUSTAF WINGQUIST, OF SKARA, SWEDEN

DOUBLE-ROW ROLLER BEARING

Application filed November 25, 1931, Serial No. 577,279, and in Sweden July 29, 1931.

This invention relates to double-row roller bearings according to my copending application Serial No. 526,871, filed April 1, 1931, for radial as well as axial load having rollers with a convex rolling surface and having more than two rolling contacts between the races and each roller, which contacts are so arranged that the pressures acting on each roller in the said contacts at the rolling balance or substantially balance each other both in the radial, the axial and the tangential direction of the roller at axial as well as at radial loading of the bearing.

Experience has proved that on account of the deformation of the material occurring at the loading the said automatic balancing will not wholly assure of a correct rolling of the rollers, and, as a consequence, undue stresses may occur between the rollers and the bearing rings. A roller obtains equilibrium in a plane passing through the axis of the roller and the bearing axis, but is capable of being turned about an axis directed towards the bearing axis perpendicular to the axis of the roller.

The present invention has for its object to prevent such a turning movement and consists substantially therein that the rollers are guided by a guide member provided between the rows of rollers and comprising preferably one or more guide rings.

In the annexed drawing some forms of embodiment of an arrangement according to this invention are shown. Fig. 1 is an axial section of a roller bearing having a guide member for the rollers according to one form of embodiment. Fig. 2 shows a modification of the guide member. Figs. 3 to 6 show axial sections of roller bearings having guide members according to four further embodiments.

Provided between the outer bearing ring 1 and the inner bearing ring 2 are two rows of rollers 3, which in accordance with my co-pending application Ser. No. 526,871 filed April 1, 1931, each bear against the respective races in a certain manner at three points 4, 5 and 6 or in four points in order to obtain an automatic balancing of the pressures acting on the rollers. 7 is the roller cage connected with the rollers in a manner known per se.

The guide member arranged between the rollers 3 according to the invention consists according to Fig. 1 of a ring 8 having such a width as to fill out the space between the rollers outside the roller cage 7, said ring bearing with its side surfaces against the inner end surfaces of the rollers, thus positively preventing a displacement of the rollers out of their proper positions, without being subjected to any considerable axial pressure.

In this form of embodiment the guide ring 8 is carried by the roller cage 7, the guide ring bearing with its inner surface against the cage. The guide ring 8 has a greater outer diameter than the inner diameter at the edges of the outer bearing ring 1, and in order to render it possible to insert the ring 8 the same is made somewhat resilient, so that the ring by being placed in a plane perpendicular to the plane of the bearing ring and by being somewhat compressed can be moved past the inner edge of the bearing ring, the guide ring being then capable of being freely turned into the proper position within the bearing.

In order further to assure of a correct position of the rollers 3 and to prevent a bending action between the rollers and the guide ring 8 the end surfaces of the rollers contacting against said ring are spherical with the center 9 located at the axis 10 of the bearing. The said surfaces of the ring 8 may here be conical or channel-shaped (torus-shaped) having a contour corresponding to the spherical end surfaces of the rollers.

The ring 8 may, as shown in Fig. 2, be divided into two rings lying adjacent to each other. Fig. 3 shows an embodiment having an outer guide ring 8 carried by the rollers, i. e. resting (floating) on the rollers.

Fig. 4 shows the guide ring 8 bearing against the spherical race of the outer bearing ring 1, the roller cage 7 being mounted within the guide ring.

Fig. 5 shows a similar embodiment, there being further provided a second guide ring 11 inside the roller cage 7 resting (floating) on the rollers 3.

Finally, Fig. 6 shows a guide ring 11 located inside the roller cage 7, said guide ring resting on the inner bearing ring 2 and being divided into two parts lying close to each other. If desired, the roller cage 7 may be mounted on the divided guide ring.

The guide ring may also, if desired, rest against both of the bearing rings.

What I claim is:

1. A double-row roller bearing of the self-adjusting type comprising inner and outer races, two rows of rollers each of which has at least one rolling contact with one of said races and two spaced rolling contacts with the other, and a floating guide ring movably mounted in the space between said race and separating the inner ends of rollers of the two rows, the axial cross-sectional form of each of the race-contacting portions of said rollers being convex, and the various contacts being so disposed that the resultant of the normal force or forces between each race and each roller shall be localized along a line passing through a contact or between a pair of spaced contacts between said roller and the other race.

2. A roller bearing, according to claim 1, of which the guide ring is supported by the end portions of the rollers.

3. A roller bearing, according to claim 1, having a roller cage associated with the rollers, and of which the guide ring is supported by the cage.

4. A roller bearing, according to claim 1, having a roller cage associated with the rollers, and a pair of guide rings, one without and one within the cage.

5. A roller bearing, according to claim 1, of which the guide ring is supported by one of the races.

6. A roller bearing, according to claim 1, of which the guide ring is a composite structure comprising two adjacent annular structures.

7. A roller bearing, according to claim 1, of which the inner end surfaces of the rollers are spherical and have centers of curvature at the intersection of the axes of the rollers with the axis of the bearing, and of which the guide ring has the sides adjacent the ends of the rollers of a channeled cross-sectional form of a curvature conforming with that of the roller ends.

SVEN GUSTAF WINGQUIST.